UNITED STATES PATENT OFFICE.

EDWARD HACKING, OF CENTRAL FALLS, RHODE ISLAND, ASSIGNOR, BY MESNE ASSIGNMENTS, TO ELECTROL MANUFACTURING COMPANY, A CORPORATION OF RHODE ISLAND.

ELECTRIC STORAGE BATTERY.

1,416,195.  Specification of Letters Patent.  Patented May 16, 1922.

No Drawing.    Application filed April 30, 1918.  Serial No. 231,620.

*To all whom it may concern:*

Be it known that I, EDWARD HACKING, a citizen of the United States of America, residing at Central Falls, Providence County, State of Rhode Island, have invented certain new and useful Improvements in Electric Storage Batteries, of which the following is a specification.

My invention relates to electric batteries and comprises a solid electrolyte for secondary or storage batteries, the battery formed therewith and process of making same. This electrolyte is as efficient as the best liquid electrolyte now known and more advantageous in many ways and much more convenient to handle. My invention applies to the standard form of secondary or storage battery as now commonly employed using lead plates and sulphuric acid, and in substance involves the mixture with such sulphuric acid of a material which cooperates with it to produce a fine, gelatinous body which apparently does not evaporate, or at least evaporates very slowly, but which either still performs all the functions of the liquid sulphuric acid as an electrolyte, or serves as a solid vehicle for retaining such acid in operative relation with the lead plates, or perhaps partly both. Whatever the true analysis of the operation the result is the full battery output of current, and also the exercising by this solid electrolyte of the function of the usual separators in holding the battery plates properly separated each from the other and in normal operative position.

According to my present information the material so as above to be added should be commercial silicate of soda, sometimes called water glass. Still further improved results are secured if a small proportion of turpentine is added to the silicate of soda. According to my best present information the preferred method of carrying out my invention is the following:

I first mix a quantity of liquid silicate of soda with about six (6) per cent of its weight of turpentine. Thus, in making enough electrolyte for an ordinary multiple cell battery, I take eight (8) liquid ounces of the silicate of soda and half a liquid ounce of turpentine and beat up the mixture until it becomes a white, milky liquid. To fill an ordinary battery cell I take half a liquid ounce of the silicate of soda, or of this turpentine-silicate-of-soda mixture last described, dilute it with two (2) liquid ounces (four times its volume) of water and add three (3) liquid ounces of a sulphuric acid solution of 1.40 specific gravity. The mixture so produced, expressed in terms of the quantity of the smallest constituent factor, the turpentine, comprises one (1) part of turpentine, sixteen (16) parts of silicate of soda, sixty-eight (68) parts of water and one hundred and two (102) parts of the particular sulphuric acid solution mentioned. The more concentrated sulphuric acid of commercial form having a specific gravity of 1.85 may be used, but it produces much heat on mixing with the silicate of soda solution. This heating action is inconvenient and might destroy the vessel containing the mixture and I prefer to use the more dilute form of the acid as specified. The mixture soon begins to set, and in from one to two hours the transformation from liquid to solid is complete so far as the eye can see, and the result is a damp gelatinous mass.

The mixture of the silicate of soda solution and the acid is made in any suitable vessel in which a homogeneous mixture can be easily produced and is then poured into the battery cells, the usual separators having first been removed from between the plates if desired, as my solid electrolyte exerts a more perfect spacing and separating action than any wooden or other separator plates. Just so much dead space and material can thus be eliminated from the battery cell and active electrolytic material substituted therefor. The mixture may, if desired, be made in the battery jar itself.

The function of the turpentine seems to be to reduce the internal resistance of the battery, and I find it has this same effect on an ordinary dry battery. It may be omitted, but with a corresponding loss in efficiency of the battery.

A portion of the sulphuric acid combines with the silicate of soda according to well known chemical laws, breaking it up into silicic acid and sulphate of soda. The silicic acid is produced in the colloidal form which is of such great bulk that it fills practically the entire space in the battery cell and is of such high permeability that it holds the residual acid in suspension without substantially interfering with the even diffusion of the acid solution, especially when the turpentine or equivalent liquid hydrocarbon is incorporated in the mixture. The sodium sulphate formed as a bi-product in the reaction merely acts, so far as I now know, as a neutral filler, comparatively small in quantity, without deleterious effect on the battery action. Other organic materials which are not oxidized by the acid, which have a low electrical resistance, which are miscible with the acid and water and of approximately the same specific gravity as the silicate of soda solution so that they can be stirred into a uniform solution therewith and remain in that condition during the short period before the reaction is completed, may be substituted for the turpentine.

The proportions of acid, water and silicate of soda in the original mixture should also be such that after the proper proportion of the acid has combined with the sodium to form the sodium sulphate, the residual acid solution will be of a specific gravity within the range ordinarily employed for standard battery solutions and at the same time produce a silicic acid mass of the proper consistency, i. e., not too hard and brittle. The proportions above given will produce this result.

One advantage of forming this solid filling in situ in the battery is that it is evenly distributed between the plates, no matter how closely they are placed together in the cell, or how tightly they are jammed in between the usual separators, if the latter are retained.

The liquid mixture originally placed or formed in the battery cell as above described evidently permeates the porous lead plates and, when the transformation to solid form has been accomplished, the pores of the plates are evidently filled with molecules of the silicic acid holding residual acid in suspension so that intimate contact is established and maintained between the plates and the electrolyte.

The advantages of my invention are obvious. The creeping and fuming destructive action of the liquid sulphuric acid electrolyte is entirely eliminated. As the very small quantity of liquid present is held in suspension in the mass of silicic acid, the battery can be tipped over at any angle without affecting its action. As there is no possibility of the plates buckling the battery will stand overcharging without serious results. In fact old batteries with cracked plates work like new ones when my invention is applied to them. No sulphating of the plates occurs when the battery stands idle, and there are no separating plates or similar devices to deteriorate with age.

As the material shakes down with use or otherwise slowly decreases in volume from any cause, the voids may be filled by pouring in a little more of the original solution, or by adding a small amount of water.

My invention practically makes a good storage battery cell indestructible by ordinary use, as it eliminates the washing from the lead plates of the fine deposits of oxide produced in normal battery action, which deposits constitute the most essential, delicate and easily destructible feature of the standard lead battery and are frequently broken up by the ebb and flow of a liquid electrolyte and other disturbing influences, and accumulate in the bottom of the cell as so much sediment. In contradistinction to this destructive action of the usual liquid electrolyte on the fine branchiform masses of active material which exist when the battery is at its highest efficiency, my solid electrolyte forms a matrix and support for these delicate structures, preventing their falling from the lead plates from the action of gravity, or any other cause, and thus maintaining the plates in their most efficient condition.

I am aware that it has been heretofore proposed to fill the cells of both secondary and primary electric batteries with an ordinary absorbent material which will hold the usual liquid electrolyte, as a sponge holds water, but these have reduced the efficiency and capacity of the battery and such effect has progressively increased with age. With my invention, however, each cell gives practically its full rated output, and can be charged in the same time as, or in less time than, is required when a liquid electrolyte alone is used, and does not deteriorate with age or use.

Having described my invention, I claim:

1. A mixture for use in electric storage batteries having lead plates, which mixture comprises silicate of soda, a sulphuric acid solution and a minor proportion of a liquid hydrocarbon miscible with all the other named constituents and non-oxdizible by the acid.

2. A mixture for electric storage batteries having lead plates, which comprises silicate of soda, sulphuric acid, and a minor proportion of turpentine.

3. A mixture for electric storage batteries which comprises approximately one part of silicate of soda, four parts of water and six parts of sulphuric acid of a specific gravity of 1.40.

4. A mixture for electric storage batteries which comprises approximately one part of silicate of soda, four parts of water and six parts of sulphuric acid of a specific gravity of 1.40, with a minor proportion of a liquid hydrocarbon miscible with the other named constituents and non-oxidizible by the sulphuric acid.

5. The process of forming a solid electrolyte for electric storage batteries containing lead plates which comprises mixing silicate of soda with about six per cent of its weight of turpentine, adding water in quantity about four times the weight of the initial mixture, mixing the resultant solution with a weight of sulphuric acid slightly in excess and permitting the mixture to solidify in, around and between the porous lead plates.

6. The product of the herein-described process being a gelatinous mass resulting from the action of sulphuric acid on a dilute solution of silicate of soda in water containing a small percentage of turpentine.

7. A storage battery comprising, in combination with the lead plates and proper container therefor, a filling of colloidal silicic acid highly permeable to liquids and gases, which filling surrounds the plates, and a solution of sulphuric acid and water of the specific gravity normally used in storage batteries, which solution is held in suspension in said colloidal mass.

8. A storage battery comprising, in combination with the lead plates and proper container therefor, a filling of colloidal silicic acid highly permeable to liquids and gases, which filling surrounds the plates, and a solution of sulphuric acid and water of the specific gravity normally used in storage batteries, which solution is held in suspension in said colloidal mass, together with a minor quantity of a liquid hydrocarbon miscible with the other original constituents and non-oxidizable by the sulphuric acid.

EDWARD HACKING.